Dec. 3, 1957
N. ROHATS
2,815,481
AUTOMATIC REJECTION CIRCUIT FOR
ELECTRICAL TESTING APPARATUS
Filed Feb. 16, 1954
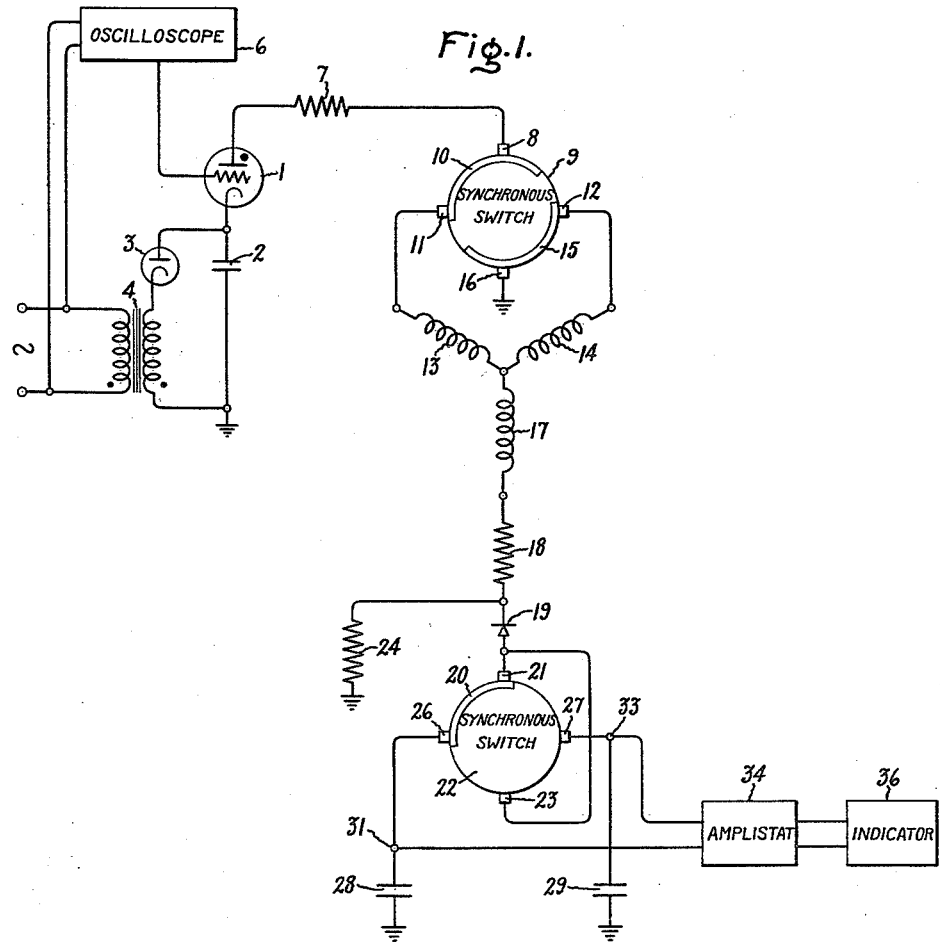
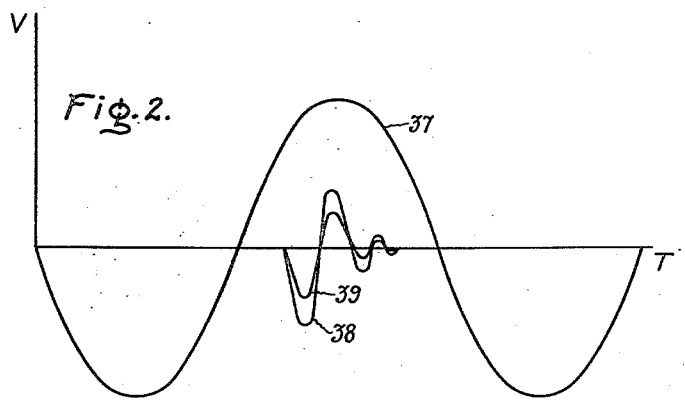
Inventor:
Nicholas Rohats,
by Charles W. Helzer
His Attorney.

United States Patent Office 2,815,481
Patented Dec. 3, 1957

2,815,481
AUTOMATIC REJECTION CIRCUIT FOR
ELECTRICAL TESTING APPARATUS

Nicholas Rohats, Scotia, N. Y., assignor to General Electric Company, a corporation of New York Application February 16, 1954, Serial No. 410,669

3 Claims. (Cl. 324—54)

This invention relates to apparatus for testing electrical equipment such as windings, and more particularly is concerned with an automatic rejection circuit for a winding insulation tester.

In Patent No. 2,321,424, issued on June 8, 1943, to the inventor in this case, and owned by the General Electric Company, assignee of this application, there has been disclosed an insulation tester which applies steep wave front voltage surges across a pair of similar series-connected windings or impedances and alternately reverses the direction of the surges therethrough. By means of such tests, the insulation of the windings to ground and between all the coils and phases thereof may be simultaneously and quickly tested. Any differences between different phases of a winding or between two different windings or impedances which are supposed to be similar will be revealed by a difference between the surge voltages which exist at the midpoint where the two supposedly similar windings or impedances are connected together. The present invention is concerned with apparatus for automatically showing this difference between these surge voltages.

It is therefore an object of this invention to provide a circuit for automatically revealing any dissimilarity between two windings or impedances.

It is a further object of the invention to provide an extremely sensitive automatic rejection circuit for an insulation tester.

In accordance with the invention, there is provided an energy storage capacitor which is charged during the negative half-cycles of an alternating current potential applied thereto, and a synchronous switch for periodically discharging said capacitor through two series-connected impedances such as windings during the positive half-cycles of the charging potential. This synchronous switch also serves to alternately reverse the direction of the resultant steep surges through said windings. Two measuring capacitors are then provided, together with a second synchronous switch which is connected to the centerpoint of the two series-connected similar windings. The second synchronous switch serves to place across one measuring capacitor the surge potential developed across one winding, when the surge through the windings is in a given direction; and this switch then places across the other measuring capacitor the surge potential across the other winding, when the surge through the windings is in the opposite direction. The difference of potential between said measuring capacitors is then amplified by an extremely sensitive device such as an amplistat and the amplified potential difference may then be used to activate an indicator, which indicator will show that there is a dissimilarity between the two windings under test. Between the two synchronous switches, there is disposed a rectifier to insure that only potentials of a negative polarity will pass through to the two measuring capacitors, thereby enabling these capacitors to charge to the peak negative value of the potential surges applied thereto. Further, a voltage divider may be disposed between the two switches to step down the potential surges applied to the two capacitors, for convenience of measurement. The speeds of the two switches are so related to the frequency of the charging alternating current potential that a voltage surge is produced during every positive cycle of the charging potential and the voltage surge is then applied alternately in opposite directions across the two series-connected windings, the potential surge across one winding during alternate positive cycles of the charging potential being applied to one of the measuring capacitors and the potential surge across the other winding being applied to the other measuring capacitor during the other positive half-cycles of the charging potential.

For a better understanding of the invention, together with other and further objects thereof, reference is had to the following description taken in connection with the accompanying drawing, wherein:

Fig. 1 is a circuit diagram of an automatic rejection circuit in accordance with the invention; and Fig. 2 is a plot of voltage v. time of the wave forms to be found at various points in the circuit of Fig. 1.

Referring now to Fig. 1 there is shown a thyratron 1, such as the FG105 or FG41, having its cathode connected to ground through energy storage means such as a capacitor 2. Across capacitor 2 is connected a diode 3, the anode of this diode being connected to the cathode of thyratron 1, and the cathode of the diode being connected through the secondary winding of a transformer 4 to ground. A cathode ray oscilloscope 6 is also provided, and positive pulses from the sweep circuit thereof are applied to the control grid of the thyratron 1, the primary winding of transformer 4 and the sweep circuit of oscilloscope 6 both being energized, as shown, from the same source of alternating current potential. The anode of thyratron 1 is connected through a resistor 7 to a contact 8 of a synchronous switch 9, and this synchronous switch also has three additional contacts 11, 12 and 16, all of the aforementioned contacts being disposed around the periphery of the switch at intervals of 90°. Synchronous switch 9 also has a pair of peripheral sectors of conductive material 10 and 15 positioned 180° apart, each sector having a length sufficient to span about 120°. As shown in Fig. 1, sector 10 connects together contacts 8 and 11, while sector 15 interconnects contacts 12 and 16, contact 16 being connected to ground. Contacts 11 and 12 are respectively connected to a pair of test windings 13 and 14, these windings being connected in series and having a third winding 17 connected to the midpoint thereof, windings 13, 14 and 17 representing a Y-connected motor armature. Winding 17 is connected through a resistor 18 to a germanium rectifier 19, which rectifier is so connected as to permit only negative surges of potential to be transmitted therethrough, and a grounded resistor 24 is connected intermediate resistor 18 and rectifier 19. Rectifier 19 is also connected to a contact 21 of a synchronous switch 22, this switch also having three additional contacts 23, 26 and 27, the contacts being disposed around the circumference of the switch at 90° intervals. Synchronous switch 22 has only a single peripheral sector 20 made of conductive material, and this sector has a length sufficient to span two contacts, Fig. 1 showing this sector as effectively connecting contacts 21 and 26. Contacts 21 and 23 are interconnected, and contacts 26 and 27 are respectively connected at output terminals 31 and 33 to a pair of electrical energy storage means such as equal capacitors 28 and 29. The other terminals of these capacitors are connected to ground and consequently together. The grounded connections of these capacitors eliminate any voltage fluctuations at the connection between these capacitors. The output terminals 31 and 33 of capacitors 28 and 29 are in turn connected to the input of an amplistat 34, which amplistat may be of the type manufactured by the General Electric Company and described in their publication GEC-790. The output of amplistat 34 is then applied to an indicator 36 which may be a relay, a bell, a meter, or any other means which will serve to indicate that there is an output from amplistat 34.

Referring now to Figs. 1 and 2, there will be described the operation of the present invention. An alternating current potential, shown as wave form 37 in Fig. 2, is applied to the primary winding of transformer 4 and also to the sweep circuit of oscilloscope 6. Diode 3 only permits capacitor 2 to charge during the negative half-cycles of applied wave form 37. During the positive half-cycles of wave form 37, a positive pulse from the sweep circuit of oscilloscope 6 is applied to the grid of thyratron 1 and serves to trigger the thyratron and discharge capacitor 2 to ground through resistor 7, contact 8, sector 10, contact 11, winding 13, winding 14, contact 12, sector 15, and contact 16 in a given direction through the windings. Resistor 7 merely serves to protect thyratron 1 in the event that there is a dead short circuit between the windings 13 and 14. The potential surge across one winding is shown as a wave form 38 in Fig. 2, and it is transmitted to resistors 18 and 24, through winding 17, these resistors serving as a voltage divider network to scale down the potential surges applied thereto. The scaled down potential surges are then applied to rectifier 19, which rectifier only permits the negative portion of the potential surge 38 to pass therethrough. These negative portions of the potential surge are applied to capacitor 28 through contact 21, sector 20, contact 26 and output terminal 31. Synchronous switch 22 has a speed that is twice that of synchronous switch 9, and synchronous switch 9 has a speed such that it turns one-quarter of a revolution for each cycle of input charging potential applied to transformer 4. Consequently, during the next positive half cycle of potential 37, assuming that switches 9 and 22 rotate counterclockwise, sector 10 will now be spanning contacts 11 and 16, sector 15 of this switch will span contacts 8 and 12, and the sector 20 of synchronous switch 22, because of the greater speed of this switch, will now be spanning contacts 23 and 27, having rotated 180°. Now it will be apparent that the discharge of capacitor 2 to ground takes place through contact 8, sector 15, contact 12, winding 14, winding 13, contact 11, sector 10, and contact 16, thus reversing the direction of the surge through windings 13 and 14. The resultant voltage surge is now applied to capacitor 29 through contact 21, contact 23, sector 20, contact 27, and output terminal 33.

If similar windings 13 and 14 have identical characteristics and oscilloscope 6 were to be connected to the centerpoint of the winding in the manner shown in the aforementioned patent, the potentials developed across the two windings would be identical and superimposed upon one another to appear upon the face of the oscilloscope as a single wave form 38. However, if one winding differs from the other, due to the fact that there are fewer turns or some defect in insulation, or for any reason whatsoever, the surge potential in one direction would appear as wave form 39 in Fig. 2, while the surge potential in the other direction would appear as wave form 38. Since the two wave forms are applied to the separate capacitors 28 and 29, which capacitors have equal capacitances, and since these capacitors only charge to the peak value of the largest negative potential applied thereto, a potential difference will exist between terminals 31 and 33. This potential difference is applied to amplistat 34 where it is amplified and caused to become apparent by indicator 36. The sensitivity of amplistat 34 may be adjusted so that indicator 36 will only show potential differences between capacitors 28 and 29 that exceed a given value. Using a 60-cycle input to transformer 4, with the synchronous switches shown in this drawing, synchronous switch 9 should have a speed of 900 R. P. M., thus turning 90° during each cycle of the input potential, while synchronous switch 22 should have a speed of 1800 R. P. M., thus turning 180° during each cycle of input potential.

It should be understood that the present invention is not limited to any specific types of synchronous switches or charge and discharge circuits, since any switching arrangement placing alternate reversed surges upon separate capacitors could be used. Moreover, although windings 13, 14 and 17 are intended to represent a Y-type of motor, a delta-type could be tested in the same way. Nor is the invention limited to windings, since any impedance could be tested in the manner described above. Even a single winding or impedance could be tested by this apparatus, provided that a similar winding or impedance to serve as a standard were provided to be connected in series with the winding or impedance under test. Further, it should be emphasized that the invention is not limited to the use of an amplistat since any type of sensitive amplifier could be used in its stead.

While there has been described what is to be considered a preferred embodiment of the invention, it will be obvious to those skilled in the art that various changes and modifications may be made therein without departing from the invention and it is aimed in the appended claims to cover all such changes and modifications as fall within the true spirit and scope of the invention.

What I claim as new and desire to secure by Letters Patent of the United States is:

1. An automatic rejection circuit for an insulation tester comprising means for impressing steep wave front voltage surges across a pair of similar series-connected windings alternately in opposite directions, a pair of electrical energy storage means, synchronous switching means connected between the centerpoint of said series-connected windings and said pair of energy storage means for alternately switching the surge voltage waves across the respective windings to said respective storage means, rectifier means disposed between said pair of energy storage means and said centerpoint of said series-connected windings for only permitting potentials of a given polarity to be impressed on said energy storage means, and indicator means responsive to and for making apparent a given potential difference between said pair of storage means.

2. An automatic rejection circuit for an insulation tester comprising means for impressing the discharge of an energy storage capacitor across a pair of similar series-connected windings alternately in opposite directions to ground, a pair of equal measuring capacitors each having a grounded terminal and an input terminal, synchronous switch means connected between the centerpoint of said series-connected windings and the respective input terminals of said pair of measuring capacitors for alternately switching the surge voltage waves developed across said respective windings to said respective measuring capacitors, rectifier means connected between said synchronous switch means and said centerpoint of said series-connected windings for only permitting potentials of a given polarity to be impressed on said measuring capacitors, and indicating means responsive to and for making apparent a given potential difference between said output terminals of said pair of measuring capacitors.

3. An automatic rejection circuit for electric testing apparatus comprising means for impressing steep wave front electrical energy surges upon a pair of similar series-connected impedances alternately in opposite directions, means including a pair of electrical energy storage means for alternately storing respectively the peak voltages of the surges of electrical energy of like polarity across the respective impedances, and indicator means responsive to and for making apparent a given electrical energy difference between said pair of storage means.

References Cited in the file of this patent

UNITED STATES PATENTS

| | | |
|---|---|---|
| 1,602,882 | Chubb | Oct. 12, 1926 |
| 2,186,268 | Pakala | Jan. 9, 1940 |
| 2,321,424 | Rohats | June 8, 1943 |